June 9, 1931. D. BORLAND 1,809,544
SEED HARVESTER
Filed March 14, 1927 4 Sheets-Sheet 1
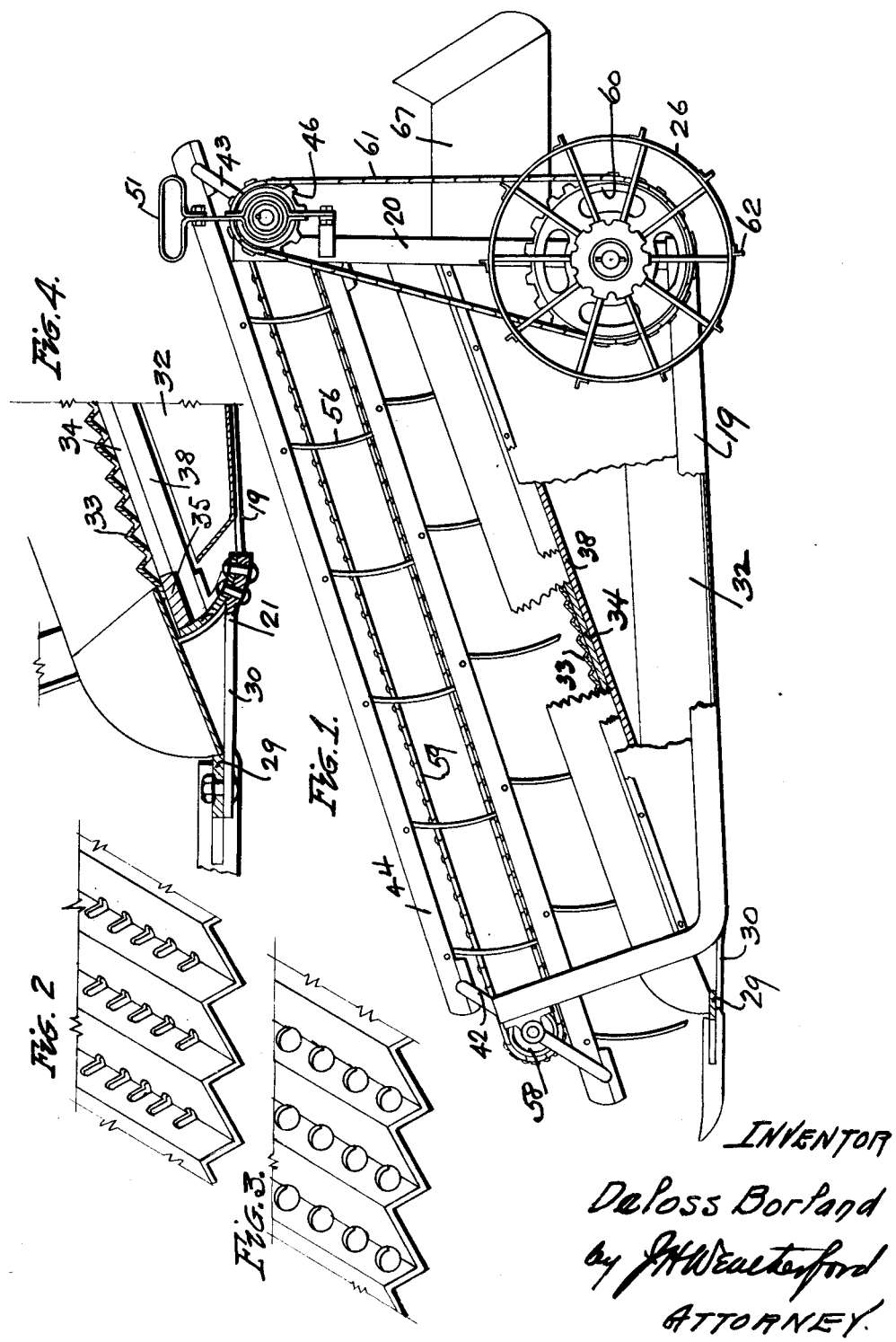
INVENTOR
DeLoss Borland
by J.H. Weatherford
ATTORNEY.

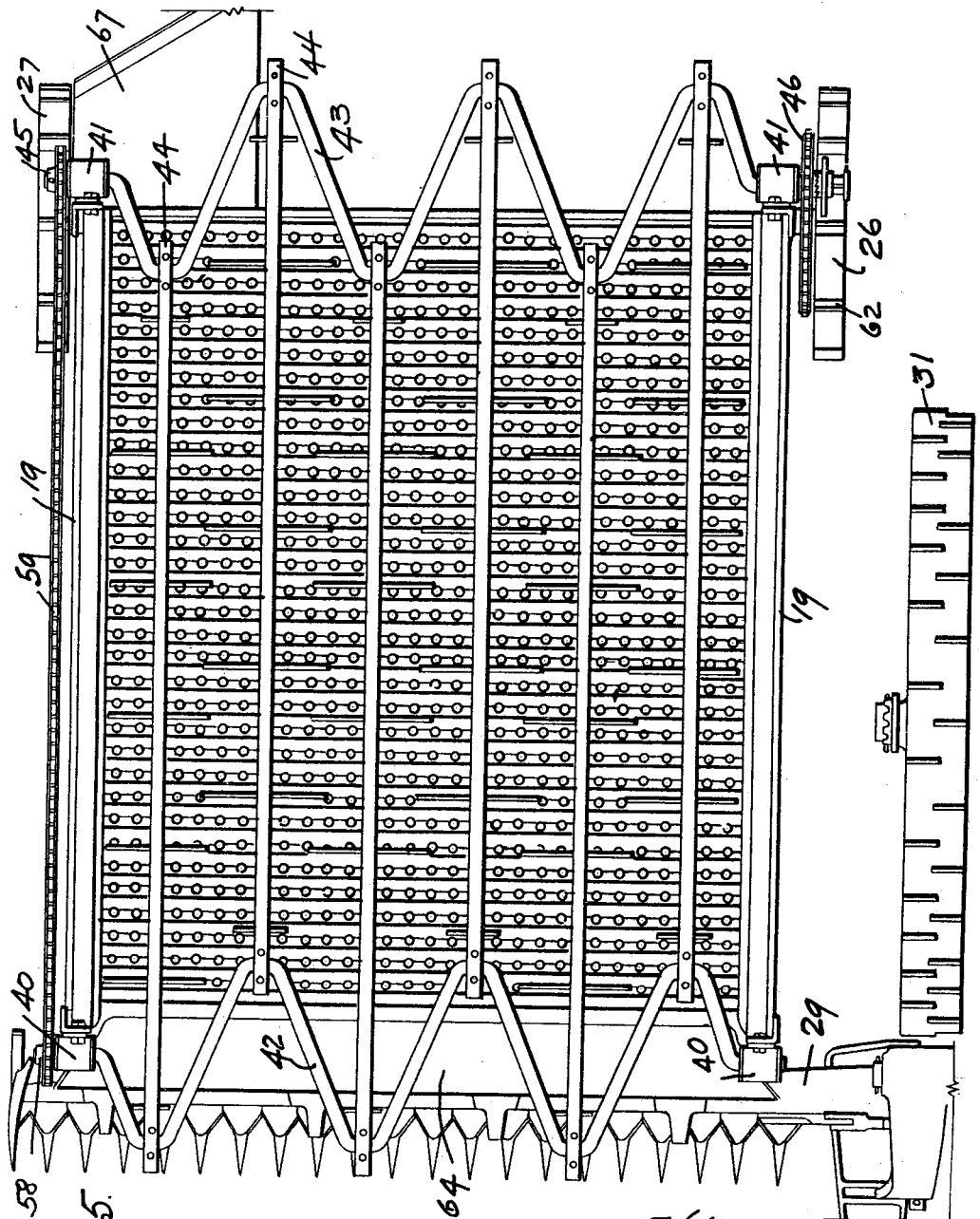

June 9, 1931.  D. BORLAND  1,809,544
SEED HARVESTER
Filed March 14, 1927   4 Sheets-Sheet 3
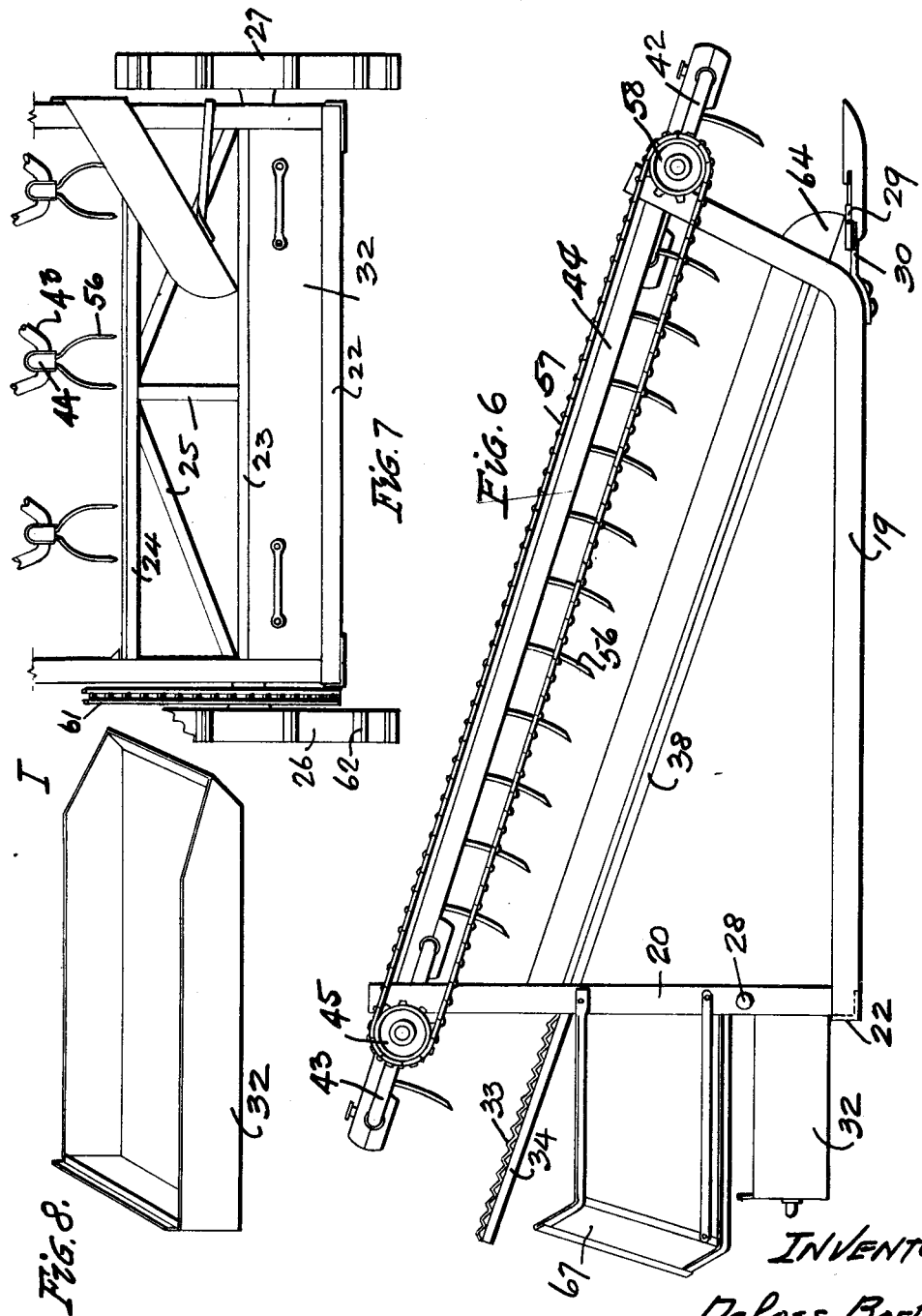
INVENTOR
Deloss Borland
by J H Weatherford
ATTORNEY.

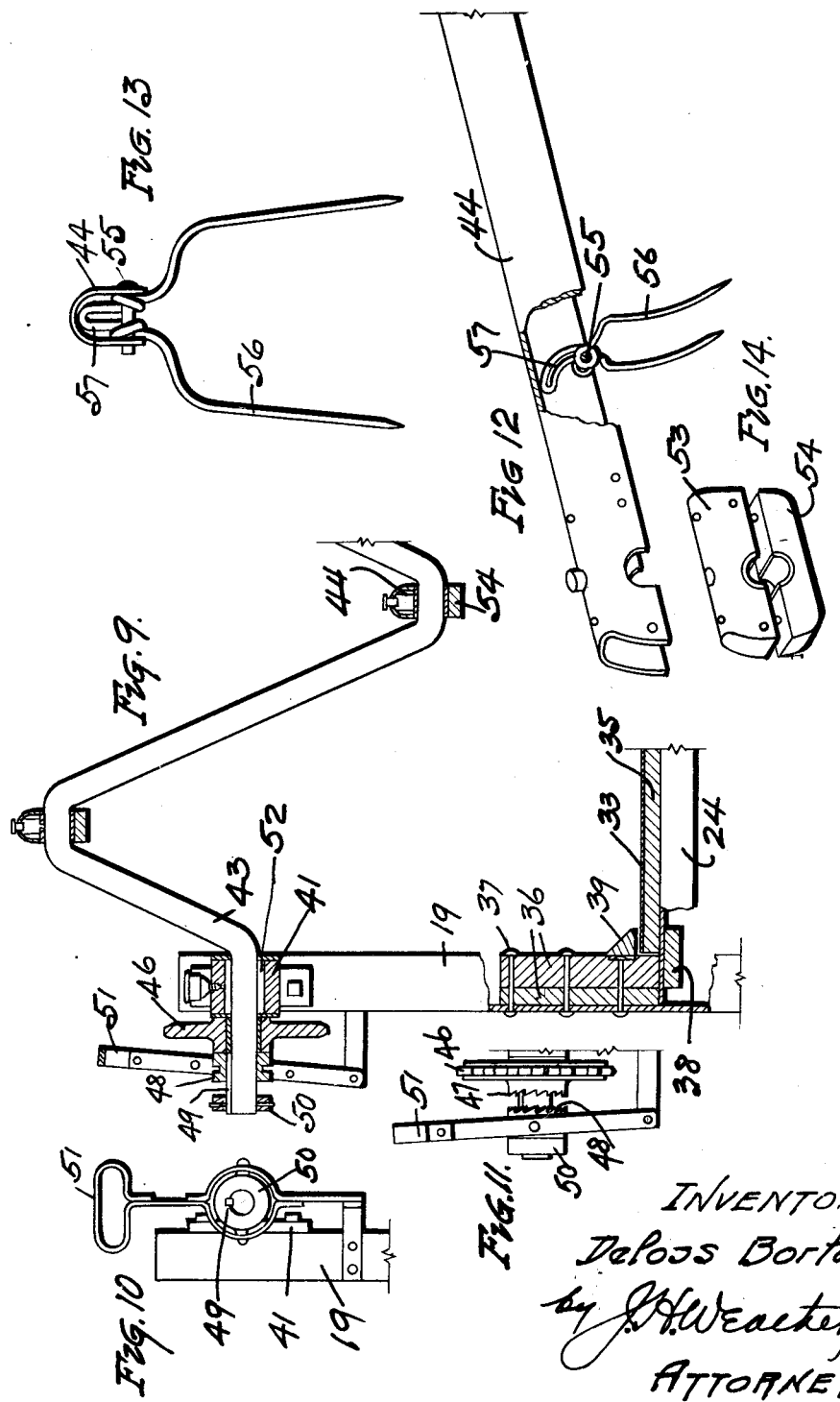

Patented June 9, 1931

1,809,544

UNITED STATES PATENT OFFICE

DELOSS BORLAND, OF CHARLESTON, MISSISSIPPI, ASSIGNOR OF THREE-FOURTHS TO MORRIS ISENBERG, OF CHARLESTON, MISSISSIPPI

SEED HARVESTER

Application filed March 14, 1927. Serial No. 175,146.

This invention relates to improvements in machines for harvesting the seeds of grasses and other plants while they are being cut for hay. It has especial reference to a machine designed for attachment to the cutter bar of a mowing machine and is especially designed with reference to the elimination of the hand labor ordinarily necessary in connection with such devices.

In cutting seed-bearing grasses such as alfalfa, lespedeza, timothy and many other plants, it has been found that in many cases a portion of the plants at least if not a large proportion of them have become so ripe that the seeds shake out and are lost during cutting. Many machines and devices have been tried in an endeavor to avoid this loss. The larger portion of these attempts have been more or less failures, first because they required an extra helper to keep them clear of the hay, second, because so much of the plants piled up on the device that the seed could not pass through the mass and were therefore carried beyond the machine and lost; third, because the screening surface used clogged up and became useless; and fourth, because the capacity of the seed pan was ordinarily too small to care for, even the small amount of seed which might have otherwise been saved.

In an endeavor to correct these mistakes the present machine was evolved.

Among the objects therefore, of my invention, are,—

(a) To provide a machine which will mechanically handle the grasses as they are cut and prevent their clogging or piling upon the screening surface of the machine.

(b) To thoroughly agitate the mass of seed during its passage over the screen surface, whereby not only will the seed be shaken through but all seed capable of dislodgment will be shaken out of the ears and recovered;

(c) To provide a more efficient screening surface and one less liable to be clogged;

(d) To provide a construction permitting ample seed storage space; and (e) To generally improve the details of design and construction of such machines.

The means by which these and other objects are accomplished, and the manner of their accomplishment, will readily be understood from the following description on reference to the accompanying drawings, in which,—

Fig. 1 is a side elevation of my machine with a small portion of the sides thereof broken away to show parts of the interior thereof.

Figs. 2 and 3 are alternate details each showing a fragmentary part of one of the screens in perspective.

Fig. 4 is a sectional detail of the draw bar attachment to the mowing machine cutter bar.

Fig. 5 is a plan view of the machine shown attached to the cutter bar of a mowing machine, and showing one of the mowing machine wheels.

Fig. 6 is a side elevation showing the tedder cranks on dead center, and also showing the seed drawer and screen, each partially removed.

Fig. 7 is a fragmentary view showing the construction of the rear end of the machine.

Fig. 8 is a perspective view of the seed drawer.

Fig. 9 is a fragmentary sectional detail showing a tedder crank shaft bearing and clutch.

Fig. 10 is a side elevation of the clutch and clutch lever.

Fig. 11 is a fragmentary elevation showing the clutch disengaged.

Fig. 12 is a perspective view of a portion of one of the tedder fork bars, with a fork in place.

Fig. 13 is an enlarged cross section of a tedder bar showing one of the forks.

Fig. 14 is a perspective view of one of the tedder bar bearings.

Referring now to the drawings in which the parts are referred to by numerals, the machine comprises side frames, 19 having rear vertical members 20 all preferably of angle iron connected together at the front end by an arcuate plate 21 and at the rear by cross members 22, 23, and 24 and suitably braced by brace members 25. The rear end of this frame is carried by wheels 26, 27 which turn on axles 28, secured to and projecting laterally from the frame 20. The front end of the machine is attached to the cutter bar 29 by a centrally disposed draw bar 30, which bar in turn is fastened to the arcuate plate 21 as by rivets. 31 is one of the wheels of the mowing machine.

32 is a pan adapted to serve as a receptacle for the seed. This pan is of a width that will just slide between the up-right vertical members 20 of the side frames and when slid in over the rear cross member 22, will drop down and be securely held from accidental displacement by the vertical flange thereof. Disposed above the pan 32 is a removable screen 33, which screen is provided with side bars 34 and end bars 35 constituting a frame therefor. 36 are filler pieces (Fig. 9) which are secured to the up-right members 19 as by rivets 37, which filler pieces form lateral guides for the insertion of this screen. Secured to the cross member 24 are longitudinal members 38 which extend from the rear of the frame to the front thereof, and are there supported by the arcuate cross member 21.

39 are side members bevelled in cross section which are suitably secured to the filler blocks 36 at the rear of the machine and to similar blocks at the front, which members form with the members 38, grooves to receive the sides of the screen. The screen may therefore be removed by pulling it rearwardly out of these grooves and similarly may be replaced by sliding it forwardly therein.

Mounted on the upper ends of the side frame members 19 and 20, are suitable bearings 40, 41, in which bearings front and rear tedder bar crank shafts 42, 43 are journalled. 44 are tedder bars, each journalled front and rear to these crank shafts. The rear crank shaft 43 projects laterally beyond both of the bearings 41 and at one end has keyed or otherwise suitably secured thereto a sprocket wheel 45. On the opposite end thereof a sprocket wheel 46 is journaled. The outer end of the hub of the sprocket 46 is provided with teeth 47 forming one-half of a clutch member. Slidably mounted on the shaft 43 outside the sprocket 46 is a collar 48, which is provided with complementary teeth. This collar is caused to rotate with the shaft 43 by a key or spline 49 and is limited in its outward movement by a collar 50. 51 is a yoke arm by which the collar 48 may be shifted into and out of, engagement with the clutch surface of the sprocket 46. When shifted into engagement, the sprocket 46 rotates the shaft 43, and as before stated, when out of engagement, it is free to rotate on the shaft.

Preferably to reduce friction rollers 52 are introduced in all the bearings so that they become roller bearings. The tedder arms 44 are preferably each formed of a single piece of thin material U shaped, in cross section. Disposed between the sides of these U's, at the ends of the bars are blocks 53, 54 provided with suitable bushings which form shaft bearings. Disposed across the U's at right angles to the bars, at suitable intervals are pins 55, on which pins tedder forks 56 are pivoted. Each of these forks is provided with an upwardly and forwardly extending portion 57 which engages the inner surface of the tedder bars and limits the rotative movement of the forks in one direction, while permitting free turning movement in the opposite direction.

58 is a sprocket on the forward crank shaft 42 which sprocket is connected by a chain 59 with the sprocket wheel 45, so that it may be rotated thereby and prevent the forward shaft from getting out of step with the rear shaft, thus maintaining the tedder bars in parallelism at all times.

The sprocket wheel 46 is driven from a sprocket 60 secured to the wheel 26, through a chain 61. 62 are lugs on the wheel 26, which provides traction power therefor. 63 is a deflecting chute disposed at the rear end of and supported by the side frame 20, at that side of the machine which is furtherest away from the mowing machine. This deflecting chute, as will be more clearly seen from Fig. 7, slopes downwardly from the outside of the machine inward, so that any grasses striking thereon are deflected toward the center of the machine and therefore away from the un-cut grass.

64 is an inclined shield the front portion of which, rests on the cutter bar in the rear of the knives and the rear portion of which rests on the forward portion of the screen 33, and which bridges the space between the cutter bar and the screen.

Referring especially to Figs. 2 and 3, it will be seen that the screen 33 is corrugated transversely and preferably that the openings therein, be they round or slotted, are located at the bottom of the corrugations, the purpose of the corrugations being to provide spaces into which the seed may drop and be below and out of the path of the masses of grass travelling over the screen.

The various parts of the machine may be secured together in any usual or desired manner, as by riveting or bolting and such attachments being common, is generally not herein shown.

In operation, the machine having been attached to the rear of the mowing machine cutter bar, the mower is driven forward in the usual manner. The grass cut by the blade falls backward on the shield 64 and is urged backward thereon by additional portions of grass cut. At the same time the forks engage the grass and rake it backward and upward along the surface of the screen. The corrugated surface of the screen provides a slightly uneven surface, which assists in shaking out the seed and the forks moving the grass along the screen surface also loosen up and shake it, causing the seed to fall out, at the same time providing a loosened mass through which the seed may readily fall. The seed which drop out or are shaken out, fall on the screen and into the corrugations thereof, and pass through the perforations therein into the seed pan below. The corrugations in the screen provide pockets which are protected from the grasses moving thereover and thereby form receptacles into which the seed may fall and in which they may remain until they pass through the perforations.

By throwing out the clutch, the machine may be driven from point to point without operation of the tedder bars. When the seed pan becomes full or it is desirable otherwise to empty it, the rear end may be raised to disengage it from the angle iron in which the back end of the drawer rests, and may then be withdrawn and emptied.

It will be understood that the drawings are illustrative only, and that I do not wish to be confined to the details herein except as they may be hereinafter set out in the claims.

Having thus disclosed the invention, what I claim is:—

1. A seed saver for attachment to the cutter bar of a mowing machine, including opposite, horizontally disposed, side members secured and braced apart, said side members having upwardly turned forward ends and having inwardly disposed flanges forming a support, a removable pan longitudinally slidable along said flanges and supported thereby, vertical posts secured to the rear ends of said side members and extending upward therefrom, axles extending laterally from said posts, and wheels on said axles, parallel supports secured to said posts, extending forwardly and downwardly therefrom to and secured to said upwardly turned side members, a removable screen slidably disposed on said inclined supports and above said pan, a plurality of tedder bars disposed above said screen and means for actuating said bars from said wheels to move cut grasses backward along said screen.

2. A seed saver for attachment to the cutter bar of a mowing machine, including opposite, horizontally disposed, side members secured and braced apart, said braces including a transverse member, at the rear end of said side members, having a vertical flange, and said side members having upwardly turned forward ends and having inwardly disposed flanges forming a support, a removable pan longitudinally slidable along and supported by said side flanges, and secured against accidental removal by said transverse flange, vertical posts secured to the rear ends of said side members and extending upward therefrom, axles extending laterally from said posts, and wheels on said axles, parallel supports secured to said posts, extending forwardly and downwardly therefrom to and secured to said upwardly turned side members, a removable screen slidably disposed on said inclined supports and above said pan and a plurality of tedder bars disposed above said screen and means for actuating said bars from said wheels to move cut grasses backward and upward along said screen.

3. A seed saver for attachment to the cutter bar of a mowing machine, comprising a frame, including opposite, horizontally disposed, side members secured and braced apart, wheels supporting the rear end of said frame, a pan supported by said side members, a forwardly and downwardly inclined screen supported by said frame above said pan, a plurality of tedder bars disposed above said screen, means for driving said bars from said wheels to move cut grasses backward and upward along said screen, and a deflecting chute disposed below the upper end of said screen, extending inward and downward from a side of said frame, secured to said frame and supported thereby.

4. A seed saver for attachment to the cutter bar of a mowing machine, comprising a frame, including horizontally disposed side members having upwardly turned forward ends and having inwardly disposed flanges forming a support, posts secured to the rear ends of said side members and extending upwardly therefrom, a pair of wheels supporting the rear end of said frame, means for securing and bracing said side members apart including a transverse member at the rear end of said side members, said transverse member having an upwardly turned flange extending above said side member flanges, a seed pan slidable over said transverse flange and longitudinally along said side member flanges, said pan being supported when in place by said member flanges and secured against accidental removal by said transverse member flange, parallel grooved supports extending forwardly and downwardly from the rear of said frame to the front thereof, secured to and supported by said posts and upwardly turned ends, intermediate the heights thereof, a screen slidably disposed in said grooved supports and above said pan, and means for advancing grasses upwardly and rearwardly along said screen, and for agitating said grasses, comprising a pair of bearings secured to the upper end of said rear posts and a similar pair of bearings secured to said upwardly turned ends, transverse shafts each mounted in a pair of said bearings said shafts having alternate crank arms oppositely disposed, a plurality of tedder bars each carried by a pair of said crank bars, forks depending from said tedder bars and means actuated by said wheels for driving said shafts.

In testimony whereof I have hereunto set my name.

DELOSS BORLAND.